United States Patent [19]

Clay

[11] 4,418,829

[45] Dec. 6, 1983

[54] WASHING AND RINSING VESSEL WITH DEBRIS CATCHING CHANNEL

[76] Inventor: Irene Clay, Rte. 2, Box 481, South Boston, Va. 24592

[21] Appl. No.: 322,054

[22] Filed: Nov. 16, 1981

[51] Int. Cl.³ .......................... B65D 1/34; B65D 1/46; B65D 43/06; B08B 9/08
[52] U.S. Cl. ..................................... 220/74; 220/1 C; 220/354; 134/84; 134/104
[58] Field of Search .................. 220/1 C, 354, 72, 74; 134/84, 91, 92, 93, 104, 201

[56] References Cited

U.S. PATENT DOCUMENTS 1,190,638 7/1916 Furman ................................. 134/104
2,084,084 6/1937 Greer ...................................... 220/354
3,742,965 7/1973 Hudziak ............................... 220/1 C

*Primary Examiner*—George E. Lowrance
*Attorney, Agent, or Firm*—Griffin, Branigan & Butler

[57] ABSTRACT

A vessel for washing and rinsing produce has a bottom and side walls upwardly extending therefrom. A debris collecting channel extends outwardly around the periphery of the side walls. In differing embodiments the channel is located either at the upper extreme of the vessel side walls or at a position intermediate the top and the bottom of the vessel. The debris collecting channel has a plurality of holes in its bottom to provide for draining liquid from the debris. The debris collecting channel may be permanently affixed or removably joined to the side walls of the vessel.

1 Claim, 5 Drawing Figures

WASHING AND RINSING VESSEL WITH DEBRIS CATCHING CHANNEL

BACKGROUND OF THE INVENTION

This invention relates to vessels which are used for washing and rinsing produce, such as fruit and vegetable products, before they are eaten raw or cooked.

The washing of fruit and vegetables is normally conducted in a kitchen sink because of its source of water and its drain for draining off the water in the course of the washing process. Well before the advent of the installation of garbage disposals in sink drainlines, fruit and vegetables were being washed in drain pans which had a plurality of drain holes in the bottom. Drain pans of this type allow a flow-through washing of the fruit and vegetables. Debris which was too large to pass through the drain holes was collected in the bottom of the pan and disposed of in a garbage receptacle after the washed fruit and vegetables had been removed from the top of the pan. Frequently, the holes in the bottom of the pan would become clogged with debris so that the water in the pan would overflow into the sink, allowing the debris to float to the surface of the water and then flow into the drain clogging the drain.

After the introduction of garbage disposal units in the drains of sinks, it became common practice to rinse off the fruit or vegetables in a sink so that the debris would be washed off and would flow down the sink drain into the garbage disposal. However, a large number of homes do not have garbage disposals because their sewage systems cannot digest all of the material that could be flushed through the garbage disposal. Moreover, even for those homes which do have disposals, the debris that accumulates upon the washing of wild berries, vegetables and fruits having fibrous leaves, stems, or the like may clog the garbage disposal unit or cause it to jam.

Consequently there is a need for a washing and draining vessel which may be placed in a sink to contain fresh fruit and vegetables while they are being washed and rinsed and to separate and retain the debris which results from washing process.

SUMMARY

According to the principles of this invention, a washing and rinsing vessel has an overflow channel mounted around its outside periphery to catch the debris which floats on the surface of the water and overflows from the vessel. The debris-catching channel has a plurality of holes in its bottom to allow the wash water to drain away, leaving the debris in the channel. The overflow and debris-catching channel may be positioned at the top of the vessel or at some position around the periphery on the sides below the top of the vessel.

The washing and rinsing vessel with an overflow debris-catching channel may be economically manufactured in one piece by molding a plastic material. Alternately, the vessel may be molded in two pieces so that the overflow and debris catching channel is removably mounted on top of a vessel having a normal flared upper edge. This would then provide a vessel which is usable for purposes other than washing and rinsing fruit and vegetables. According to the embodiments disclosed herein the configuration of the vessel may be varied as desired to meet demands.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
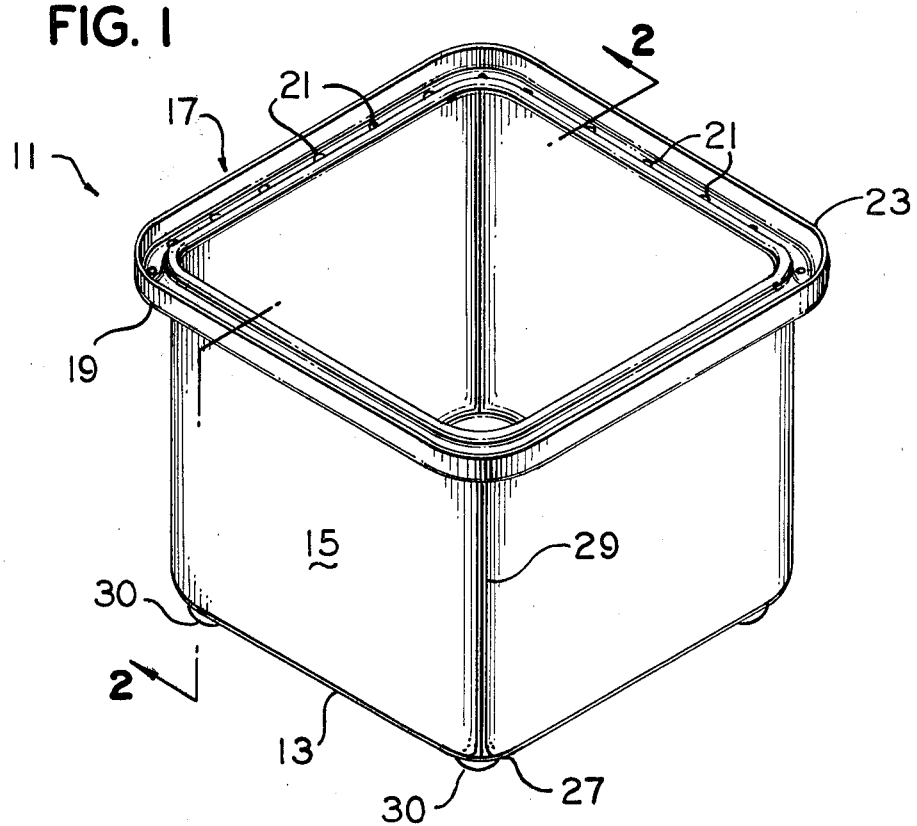
FIG. 1 is a perspective view illustrating an embodiment of the invention.
Figure 2:
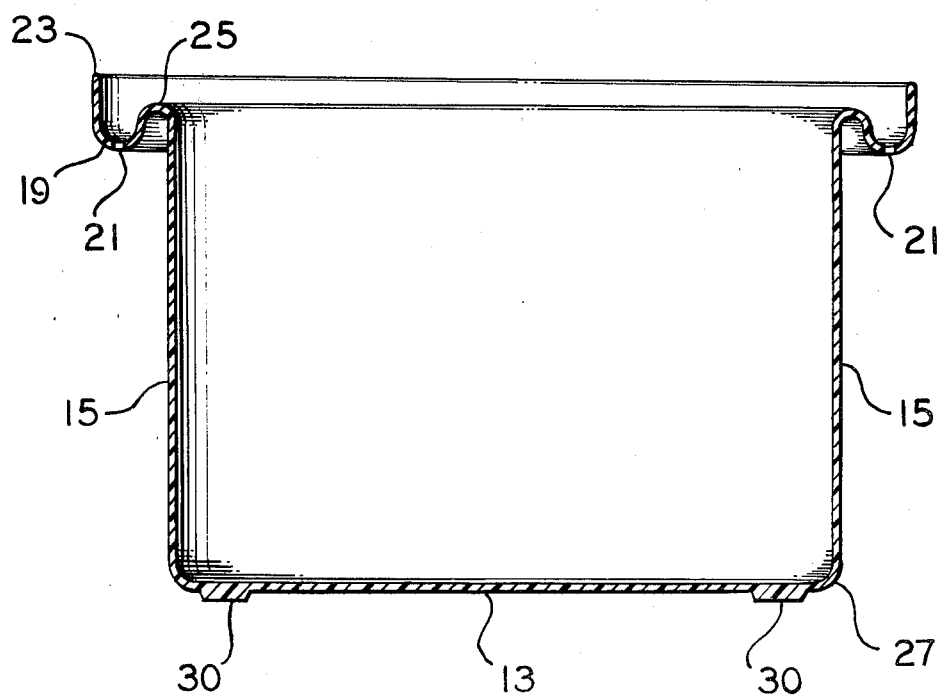
FIG. 2 is a sectional view of an embodiment of the invention along lines 2—2.

FIG. 1 illustrates a vessel 11 having a bottom 13 and sidewalls 15 which extend upwardly therefrom to form a water-tight seal or joint with the bottom 13. A debris-catching means 17 extends outward and around the periphery of the top of the sidewalls 15. The debris-catching means 17 is in the form of a channel or trough 19 with a plurality of draining means, such as holes 21, spaced around its bottom. An outside top edge 23 of the channel 19 is higher than the top 25 of the sidewalls 15 to which the channel 19 is attached as can be seen FIG. 2.

In a preferred embodiment, the vessel 11 has a rectangular or square shaped bottom 13 with rounded corners 27 where the sidewalls 15 join the bottom 13. The corners 29 where the sidewalls 15 join each other are also rounded. A plurality of legs 30 protrude downward from the vessel bottom 13 in proximity to the corners 27.

Figure 3:
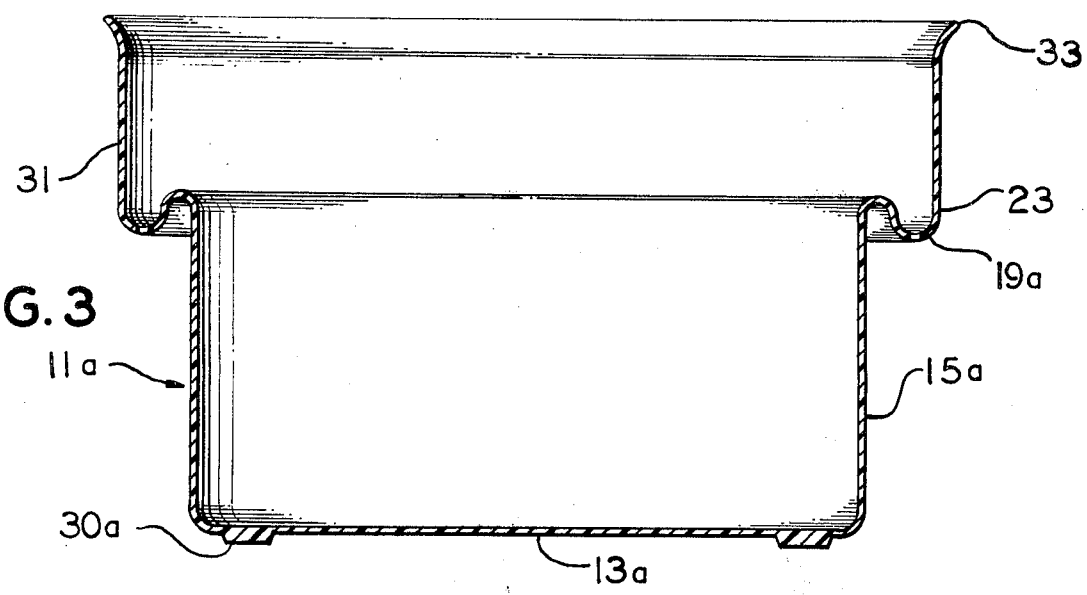
FIG. 3 is a sectional view of another embodiment of the invention.

In another embodiment seen in FIG. 3, the channel or trough 19a is positioned between the bottom 13a and the top 25 of the sidewalls 15a. The channel 19a extends outward from the sidewall 15a and an upper sidewall portion 31 joins and extends upward from the outside top edge 23 of the channel 19a. A top edge 33 of the upper sidewall portion 31 is flared outwardly.

Figure 4:
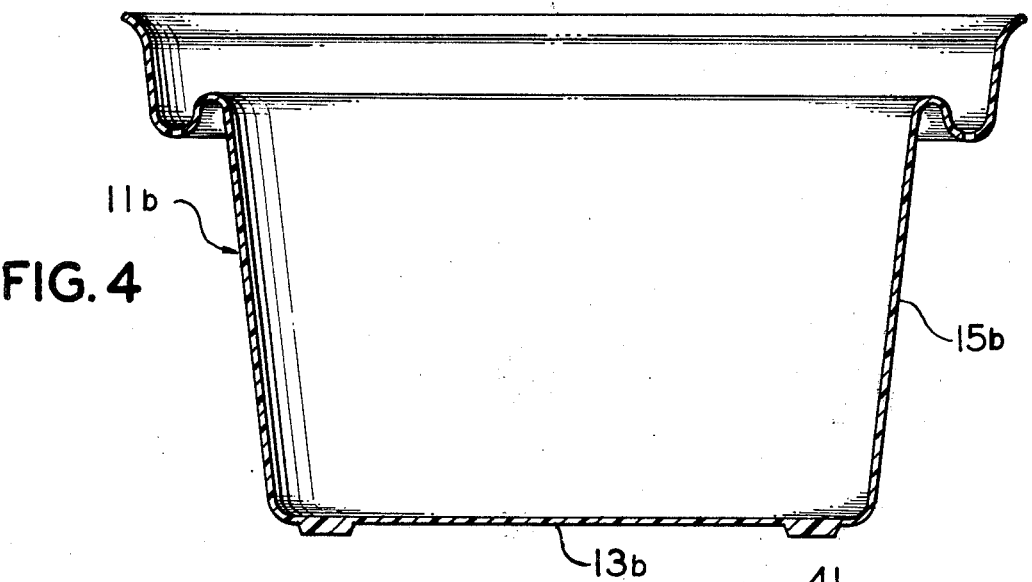
FIG. 4 is a sectional view illustrating another embodiment of the invention.

As illustrated in FIG. 3, the sidewalls 15a may extend vertically upward from the bottom 13a, or as shown in FIG. 4, the sidewalls 15a may be inclined upwardly to form an angle with the bottom 13b.

Figure 5:
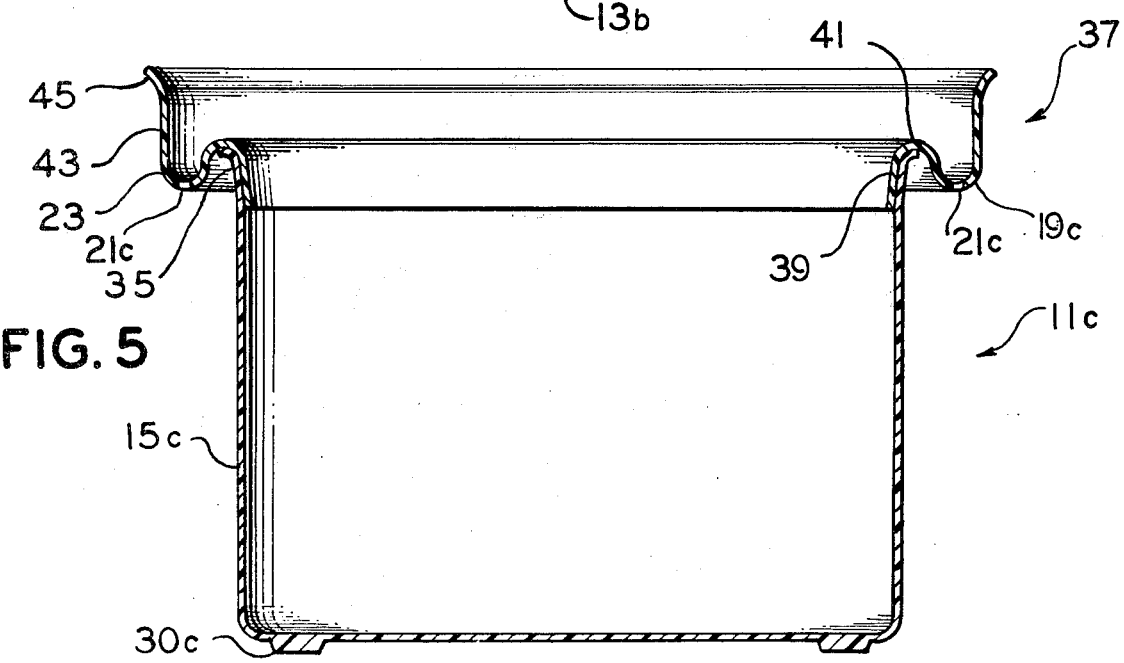
FIG. 5 is a sectional view illustrating another embodiment of the invention.

In another embodiment as shown in FIG. 5, the vessel 11c may have sidewalls 15c with flared top edges 35. A removable debris-catching means 37 has a channel or trough 19c with a plurality of holes 21c in its bottom and an interior flange 39 which extends downwardly from a rounded interior edge 41 of the channel or trough 19c. The interior flange 39 of the debris catching means 37 fits inside of the flared top edges 35 and forms a water-tight seal with the sidewalls 15c. A short sidewall 43 may extend upward from the outside top edge 23 of the channel 19c to a flared top edge 45.

In operation, the vessel 11 filled with berries or the like is placed in a sink having a drain. A water faucet is turned on directing water onto the top of the berries in the vessel 11. As the water level rises and the debris floats to the surface, the water overflows the sidewalls 15 into the trough 19 carrying the debris with it. The water drains from the plurality of holes 21 but the debris is retained in the trough 19 for later removal when the washing process is completed. The berries may be removed from the vessel by hand as they are washed. When the washing process is completed, the vessel 11 is tilted to allow all of the water to drain from the remaining berries. The debris is then removed by hand from the trough 19, and the berries can then be dumped from the vessel 11.

In the FIG. 5 embodiment discussed above, after the liquid has been completely drained from the berries, the removable debris-catching means 37 can be removed from the top of the vessel 11c and the debris dumped into a garbage can or flushed into a garbage disposal. The berries are retained in the vessel 11c or disposed of by dumping them from the vessel 11c into another vessel.

The washing and rinsing vessel described above can be economically and easily manufactured from a plastic material or the like and provides a means for readily washing the debris from berries, fruit, vegetables or the like and at the same time catching the debris in a manner not now available in order to prevent the clogging of sink drains or garbage disposal units.

While the invention has been particularly shown and described with reference to preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A vessel for washing and rinsing produce which leaves the produce virtually free of debris, said vessel comprising:

a bottom wall and side walls surrounding said bottom wall and extending upward from said bottom wall, said bottom wall and side walls defining a cavity adapted to contain said produce and to have a washing liquid introduced therein, said side walls having an outwardly extending flange about the entire periphery of said vessel at the upper extremity of said side walls, said flange being joined to channel depending immediately from the outermost edge of said flange and extending about the entire periphery of said vessel, said channel having a plurality of drain holes in the bottom of said channel, said channel terminating in an outer peripheral wall having an upper terminal edge higher than said flange, and said outer peripheral wall being joined to said side walls so that washing liquid and debris unrestrictedly overflow said outwardly extending flange of said side walls into said channel while restricted in movement therefrom by said outer wall, and said washing liquid in said channel is being constantly drained through said drain holes in said channel and while said debris is retained in said channel.

* * * * *